(12) United States Patent
Lyatkher

(10) Patent No.: US 8,177,477 B2
(45) Date of Patent: May 15, 2012

(54) DAM-FREE HYDRO-POWER PLANT

(76) Inventor: Victor Lyatkher, Richmond Hts., OH (US)

( * ) Notice: Subject to any disclaimer, the term of this patent is extended or adjusted under 35 U.S.C. 154(b) by 0 days.

(21) Appl. No.: 12/284,577

(22) Filed: Sep. 23, 2008

(65) Prior Publication Data

US 2009/0085356 A1     Apr. 2, 2009

(30) Foreign Application Priority Data

Sep. 27, 2007   (RU) .................................. 2007135746

(51) Int. Cl.
*F03B 13/12* (2006.01)

(52) U.S. Cl. .............. 415/3.1; 415/906; 290/53; 290/54

(58) Field of Classification Search ............ 415/3.1, 415/906; 416/3.1; 290/52, 53, 55
See application file for complete search history.

(56) References Cited

U.S. PATENT DOCUMENTS 6,933,624 B2 *   8/2005   Beaston ........................ 290/43

FOREIGN PATENT DOCUMENTS

| JP | 58183870 | | 10/1983 |
|----|----------|---|---------|
| JP | 60098174 | A * | 6/1985 |
| RU | 2241092 | | 11/2004 |

OTHER PUBLICATIONS

Shirinskij A.F., New means for adaptation of power systems to an environment. Nov. 1993 Hydro-Teknicheskoye Stroitelstvo. Moscow, Russia.

* cited by examiner

*Primary Examiner* — Edward Look
*Assistant Examiner* — Dwayne J White

(57) ABSTRACT

A dam-free hydro-power plant for generating electricity comprises a convergent-divergent water passage including a cylindrical neck containing a shutter, branch pipes connected with the neck, each branch pipe including a reverse valve capable of triggering, depending on the stream direction in the passage. A first and second branch pipes are located in front of the shutter, a third and fourth branch pipes are located behind thereof, a first and second buffers accumulating respectively higher-pressure liquid and lower-pressure liquid, the buffers are communicated through a cross-flow pipeline enclosing a turbine joined with an electro-generator. The first buffer is communicated with the neck via the first and the third branch pipe, whereas the second buffer is communicated with the neck via the second and the fourth branch pipe. The plant is highly efficient due to deploying hydro-impact, and particularly usable in places of tidal activities, in freezing rivers for all-year-round generating electricity.

1 Claim, 1 Drawing Sheet

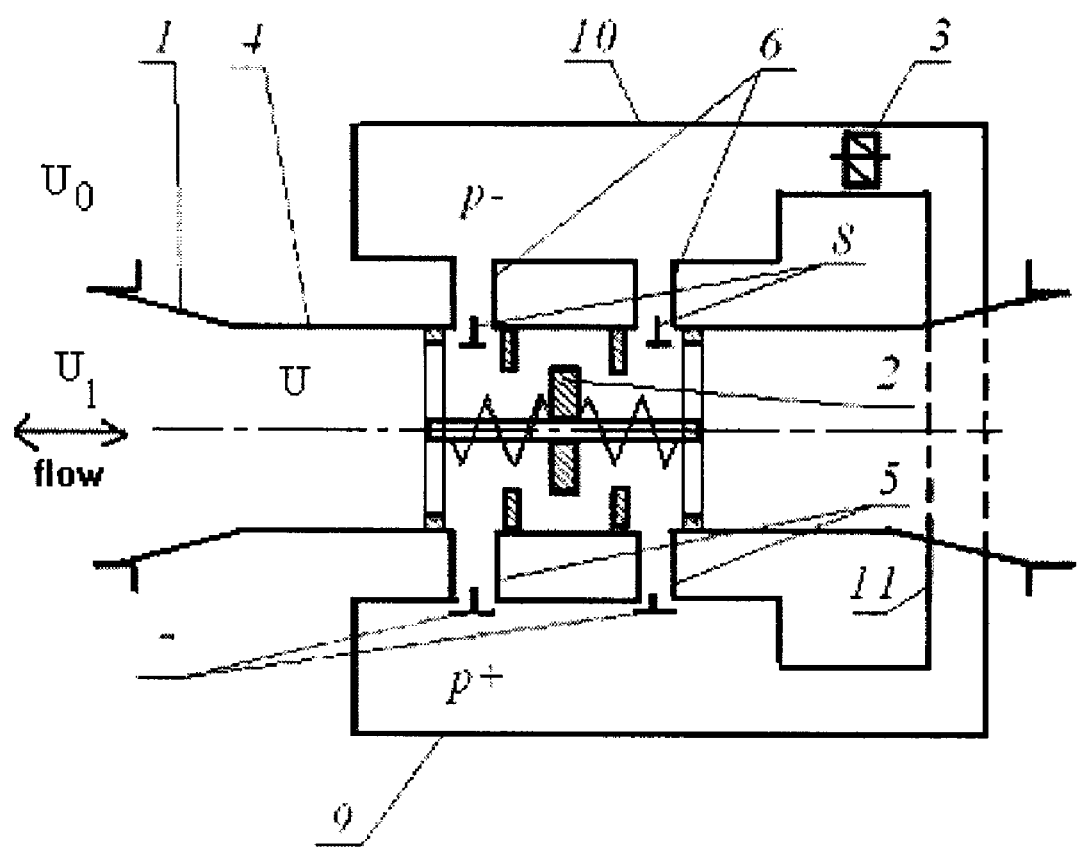
FIGURE

DAM-FREE HYDRO-POWER PLANT

CROSS-REFERENCE TO RELATED APPLICATIONS

This U.S. patent application claims priority under 35 U.S.C. 119 (a) through (d) from a Russian Federation patent application No. 2007135746 filed on 27 Sep. 2007.

BACKGROUND OF THE INVENTION

The invention relates to the field of hydro-power engineering, namely to hydroelectric power plants and stations, and is primarily intended for conversion of renewable energy possessed by water currents of rivers and other water reservoirs, as well as for conversion of renewable tidal energy into electric power of direct or alternating current.

There is known a hydroelectric power plant including a plate, leanly submerged into water towards the water stream at ⅓ of the depth, with a takeoff of energy of the most potential upper layer of the water stream, elevating the specified layer to a predetermined height, and guiding it to a funnel-shaped mouth of a vertical cavity; and a turbine mounted at the base of the vertical cavity on a vertical axis (see article by A. F. Shirinskiy, New means of adaptation of power systems to natural environments; Journal 'Hydraulic engineering construction' NTA Energoprogress—1993, No 11, p. 3).

Such hydroelectric power plants without a dam have a deficiency in that the operation of the turbine depends on the elevation level of the water stream provided by the plate, and consequently the stream potential energy in such a unit is insignificant. Additionally, the turbine is mounted on the vertical axis that results in an increase of overall dimensions of the hydroelectric power plant.

There is also known a free-flow hydraulic unit mounted near a dam and comprising a turbine disposed within its body, joined with an electric generator, (JP Patent No. 58183870, issued 27 Oct. 1983).

The mentioned hydro unit, being installed at the bottom of a river near a dam, allows generating electric energy. However, it has rather low efficiency that is conditioned by the fact that the pressure of water is practically created only by the tilt of riverbed, and therefore the power capacity of such hydroelectric plants is relatively small. In addition, the slow rotation of the driving wheel of turbine requires implementation of heavy and expensive multiplying gears for transmission of the rotation to the electro-generator.

The closest prior art to the present invention in terms of its structure and achievable result is a dam-free hydroelectric power plant comprising a water passage with a cut-off valve and a turbine disposed within the passage (Patent RU No. 2241092).

The design of aforesaid hydroelectric power plant allows utilizing the energy of hydro-impact for increasing the efficiency of the power plant. However, the necessity of raising the water stream above the river level for supplying the stream to the cut-off valve leads to additional losses of the water stream energy that reduces the efficiency of conversion of the stream energy into electric energy. Besides, the necessity of creation of the vertical channel for water delivery to the driving wheel of turbine leads to complication of the design of such power plant, and increasing its dimensions. Additionally, the hydroelectric power plant is efficient only when the water stream flows in one direction.

BRIEF SUMMARY OF THE INVENTION

The present invention is directed to solving a problem of creation of a simple free-flow device, which can be placed under a water level in a floating condition, or can be mounted at the bottom of a river, in a coastal area of seas, oceans, or lakes, or in the places of tidal activities.

The results achievable by the invention are: an increase of profitability and efficiency of the power plant by means of the fuller usage of water streams energy, and an opportunity of all-year-round employment of hydroelectric power plants without a dam, especially on the rivers freezing in the cold time, or in slow water currents conditions.

The specified problem is solved, and the results are obtained due to a special design of the inventive hydroelectric power plant, comprising: a water passage made in a convergent-divergent shape including a cylindrical neck preferably in its middle portion, a fast-response (low-inertial) shutter (conventional shut-off valve) mounted in the neck; four cross-flow branch pipes, each branch pipe is connected with the cylindrical neck, the branch pipes each includes a reverse valve of a double-acting type capable of triggering, depending on the water stream direction in the passage, the reverse valves each is mounted within the corresponding branch pipe, wherein a first branch pipe and a second branch pipe are located in front of the shutter, and a third branch pipe and a fourth branch pipe are located behind thereof in relation to the course of water stream in the passage; a first buffer vessel (further called 'first buffer') accumulating higher pressure liquid and a second buffer vessel (further called 'second buffer') accumulating lower pressure liquid, the first and second buffers are communicated by means of a cross-flow pipeline; a turbine joined with an electro-generator, which turbine is enclosed within the cross-flow pipeline; wherein the first buffer is communicated with the cylindrical neck via the first branch pipe located in front of the shutter, and via the third branch pipe located behind thereof, whereas the second buffer is communicated with the cylindrical neck via the second branch pipe located in front of the shutter, and via the fourth branch pipe located behind thereof.

The analysis of known waterpower plants has shown, that there is an opportunity to increase their efficiency and to lower their specific consumption of materials due to fuller usage of the water flow energy, both in the forward direction and in the opposite direction that takes place during tidal activities in the coastal zones of seas and oceans.

These aims are attained due to a special design of the inventive waterpower plant comprising: a water passage made in a convergent-divergent shape including a cylindrical neck; a fast-response shutter mounted in the neck; four cross-flow branch pipes, each branch pipe is connected with the cylindrical neck, the branch pipes each includes a reverse valve of a double-acting type capable of triggering, depending on the water stream direction in the passage, the reverse valves each is mounted within the corresponding branch pipe, wherein a first branch pipe and a second branch pipe are located in front of the shutter, and a third branch pipe and a fourth branch pipe are located behind thereof in relation to the course of water stream in the passage; a first buffer accumulating higher pressure liquid and a second buffer accumulating lower pressure liquid, the first and second buffers are communicated by means of a cross-flow pipeline; a turbine joined with an electro-generator, the turbine is enclosed within the cross-flow pipeline; wherein the first buffer is communicated with the cylindrical neck via the first branch pipe, and via the third branch pipe, whereas the second buffer is communicated with the cylindrical neck via the second branch pipe, and via the fourth branch pipe.

The above described design makes it possible to solve at once two engineering problems: reducing hydraulic resistance of the water passage, and partially transforming potential energy of the water stream into kinetic energy of the stream that encounters the shutter with a significant velocity. In turn, this allows increasing energy of the artificially created hydro-impact.

Besides, due to the energy of hydro-impact, the inventive structure of hydroelectric power plants with two buffers allows creating a higher pressure of liquid in the first buffer, and, on the contrary, creating a lower pressure of liquid in the second buffer, which leads to an increase of the pressure difference in the cross-flow pipeline connecting the buffers that drives the turbine, and thereby significantly improves its efficiency and power output.

During ocean and sea tidal activities, and sometimes during flood activities in some localities, the water stream changes its direction to the opposite. The inventive structure of power plant enables converting the stream energy into electric power independently on the water stream direction. This feature is conditioned by incorporating the high-speed shutter of bilateral action into the structure and by the communication of the cylindrical neck with each of the two buffers by means of two branch pipes, one of which is connected to the neck before the shutter, and the other is connected to the neck behind the shutter in relation to the course of water stream.

The opportunity of installation of the inventive hydroelectric power plant without a dam below the water level, for example in a river, allows exploitation of the plant during the winter period, when the river is covered by ice. In other embodiments, such power plant, immersed into seawater, may operate during strong surface sea waves without significant influences therefrom.

BRIEF DESCRIPTION OF THE DRAWING

Attached hereto FIGURE shows a schematic view of a dam-free power plant according to a preferred embodiment of the present invention. Each reference numeral indicated on FIGURE is designated to an element of the inventive structure described herein below. A first time introduced reference numeral in the description is enclosed into parentheses.

DETAIL DESCRIPTION OF A PREFERRED EMBODIMENT OF THE INVENTION

While the invention may be susceptible to embodiment in different forms, there is shown in the drawing, and will be described in detail herein, a specific embodiment of the present invention, with the understanding that the present disclosure is to be considered an exemplification of the principles of the invention, and is not intended to limit the invention to that as illustrated and described herein.

As illustrated on FIGURE, the inventive dam-free power plant comprises a water passage (1) formed in a convergent-divergent shape, having a cylindrical neck (4) situated preferably in the middle portion of the neck 1; a fast-response shutter (2) mounted in the neck 4; two cross-flow branch pipes (5) and two cross-flow branch pipes (6), each branch pipe 5 or 6 is connected with the cylindrical neck 4, each of the branch pipes 5 includes a reverse valve (7), each of the branch pipes 6 includes a reverse valve (8), wherein the valves 7 and 8 are chosen of a double-acting (bilateral) type capable of triggering, depending on the water stream direction in the passage 1, the reverse valves each is mounted within the corresponding branch pipe, wherein a first branch pipe 5 and a second branch 6 pipe are located in front of the shutter 2, and a third branch pipe 5 and a fourth branch pipe 6 are located behind thereof in relation to the course of water stream in the passage 1; a first buffer (9) accumulating higher pressure liquid and a second buffer (10) accumulating lower pressure liquid, the first buffer 9 and second buffer 10 are communicated by means of a cross-flow pipeline (11); a straight-flow high-speed turbine (3) joined with an electro-generator (not illustrated), the turbine 3 is enclosed within the cross-flow pipeline 11; wherein the first buffer 9 is communicated with the cylindrical neck 4 via the first branch pipe 5 located in front of the shutter 2, and via the third branch pipe 5 located behind thereof, whereas the second buffer 10 is communicated with the cylindrical neck 4 via the second branch pipe 6 located in front of the shutter 2, and via the fourth branch pipe 6 located behind thereof.

The dam-free hydroelectric power plant can be exemplarily mounted in a stream of water floating below the water level, at the bottom of a river, or in a coastal zone of sea along a direction of the water stream.

BASICS OF OPERATION OF THE INVENTION

Entering the passage 1, a free water stream with a velocity $U_0$ and a pressure $p_0$ in the central line of stream is slightly decelerated to a velocity $U_1$ with a small pressure increase up to a pressure $p_1$, and then accelerates at the confuser segment of the passage 1 up to a velocity $U>U_0$ with a respective decline of pressure to a value of p ($p<p_0<p_1$). This pressure decline is accompanied by extraction (freeing) of air dissolved in water. The water stream enters the cylindrical neck 4 and encounters the shutter 2 that blocks the flow section of the cylindrical neck 4. As a consequence, a hydraulic impact (shock) with a sharp increase of pressure takes place. In a cylindrical neck 4, a contraction wave of pressure is originated, and further propagates with a velocity c from the shutter 2 directed opposite to the water stream with an increase of frontal pressure:

$$p+=\rho Uc \qquad (1),$$

Simultaneously an expansion wave of pressure is originated, and further propagates with a velocity c from the shutter 2 directed along the water stream with a decrease of frontal pressure:

$$p^-=-\rho Uc \qquad (2).$$

The reverse valve 7 of the first branch pipe 5, located before the shutter 2, is opened to pass high pressure water from the high pressure zone of the neck 4 into the buffer 9, whereas the reverse valve 8 of the fourth branch pipe 6, located behind the shutter 2, is opened to pass low pressure water from the buffer 10 into the low pressure zone of neck 4. The process continues until the pressure waves return, having reflected from the free ends of the water passage 1.

At this moment the reverse valves 7 and 8 are closed, the shutter 2 is opened, and the water stream in the passage 1 accelerates to its initial speed. The process cyclically repeats. The pressure difference in the buffer 9 and buffer 10 gradually and continuously drives the turbine 3 disposed in the pipeline 11 communicated with the buffers.

If the stream alters its direction to the opposite (an incoming flow is replaced by an outcoming flow, e.g. due to tidal activities), the process in essence does not vary, since the other pair of branch pipes 5 and 6 (the second pipe 5 and the third pipe 6) will operate. The buffers 9 and 10 keep their functions, and the turbine 3 rotates in the same direction.

It should be noted that aeration, even at a minor density of air in water, sharply decreases propagation of shock waves in water that provides sufficient time for filling up the buffer 9 from the overpressure zone of passage 1, and for drawing low-pressure water from the buffer 10 into the deficit pressure zone of passage 1, which ensures a stable running of the turbine 3.

Thusly, the inventive waterpower plant has the following advantages at low speeds of the stream: the pressure differential driving the turbine 3 can reach 4 $\rho c\, U_0$ and more, where $\rho$—is a water density, c—is a propagation velocity of elastic waves in the water passage 1, $U_0$—is a velocity of water at the point of approach to the water passage 1.

The wave propagation velocity in water with bubbles of air in which pressure is equal p is determined by a density of mixture $\rho_0$, a modulus of elasticity of water E, and a concentration of air s:

$$c=\{\rho_0[1/E+s/p]\}^{-0.5} \qquad (3)$$

At small concentration of air and low rigidity of the walls of passage 1, it is necessary to enter into the formula (3) known adjustments from the theory of hydraulic impact in pipes.

The present invention can be used for generation of electric power in conditions where natural or artificially created water streams exist, in particular in agriculture, forestry, and other industries, and also for individual use, especially in rural areas.

I claim:
1. A dam-free hydraulic power plant comprising:
a water passage made in a convergent-divergent shape including a cylindrical neck;
a fast-response shutter mounted in the neck;
four cross-flow branch pipes, each said branch pipe is connected with the cylindrical neck, the branch pipes each includes a reverse valve of a double-acting type capable of triggering, depending on the water stream direction in the passage, the reverse valves each is mounted within the corresponding branch pipe, wherein a first branch pipe and a second branch pipe are located in front of the shutter, and a third branch pipe and a fourth branch pipe are located behind thereof in relation to the course of water stream in the passage;
a first buffer accumulating higher pressure liquid and a second buffer accumulating lower pressure liquid, the first and second buffers are communicated by means of a cross-flow pipeline;
a turbine joined with an electro-generator, said turbine is enclosed within the cross-flow pipeline;
wherein the first buffer is communicated with the cylindrical neck via the first branch pipe and via the third branch pipe, whereas the second buffer is communicated with the cylindrical neck via the second branch pipe and via the fourth branch pipe.

* * * * *